(No Model.) 2 Sheets—Sheet 2.
J. H. MASTERS.
COTTON HARVESTER.
No. 432,420. Patented July 15, 1890.
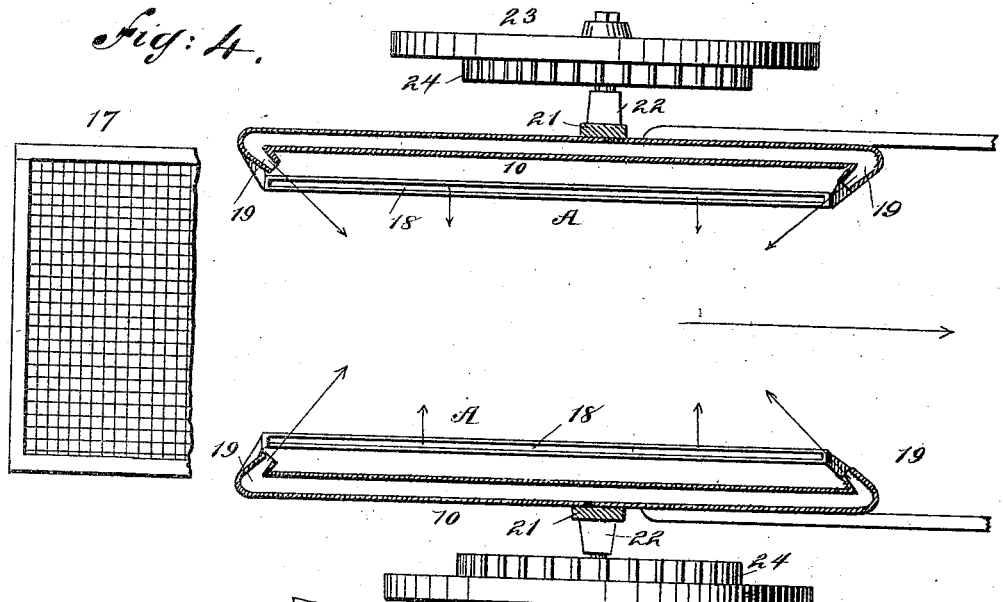
Fig: 4.
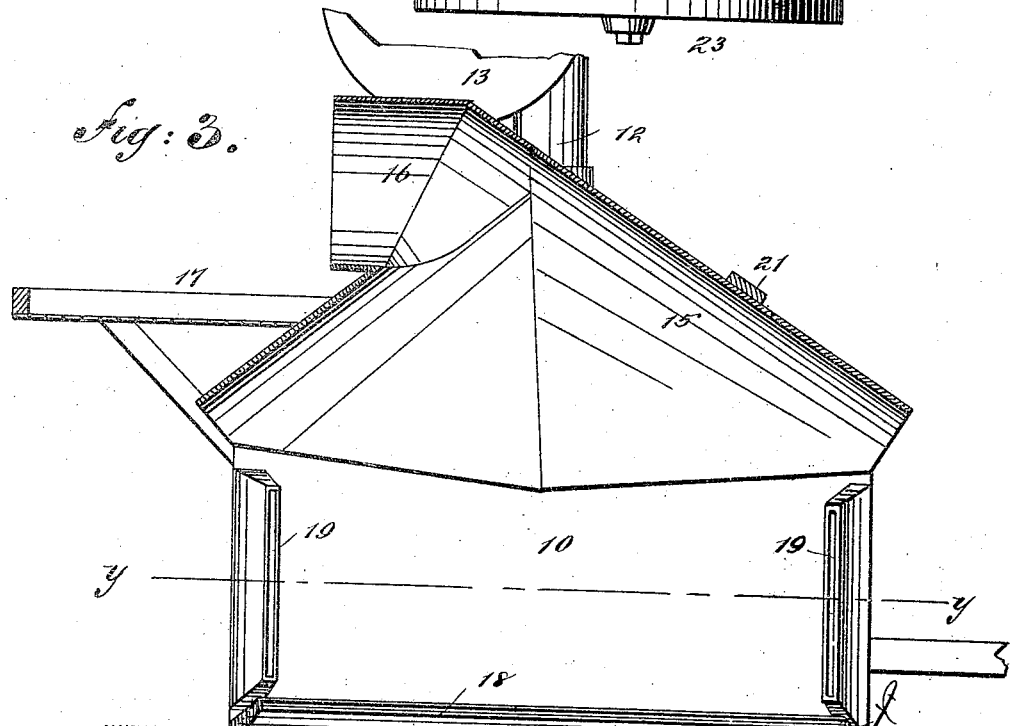
Fig: 3.
WITNESSES
Chas. Nida
C. Sedgwick
INVENTOR:
J. H. Masters
BY Munn & Co
ATTORNEYS

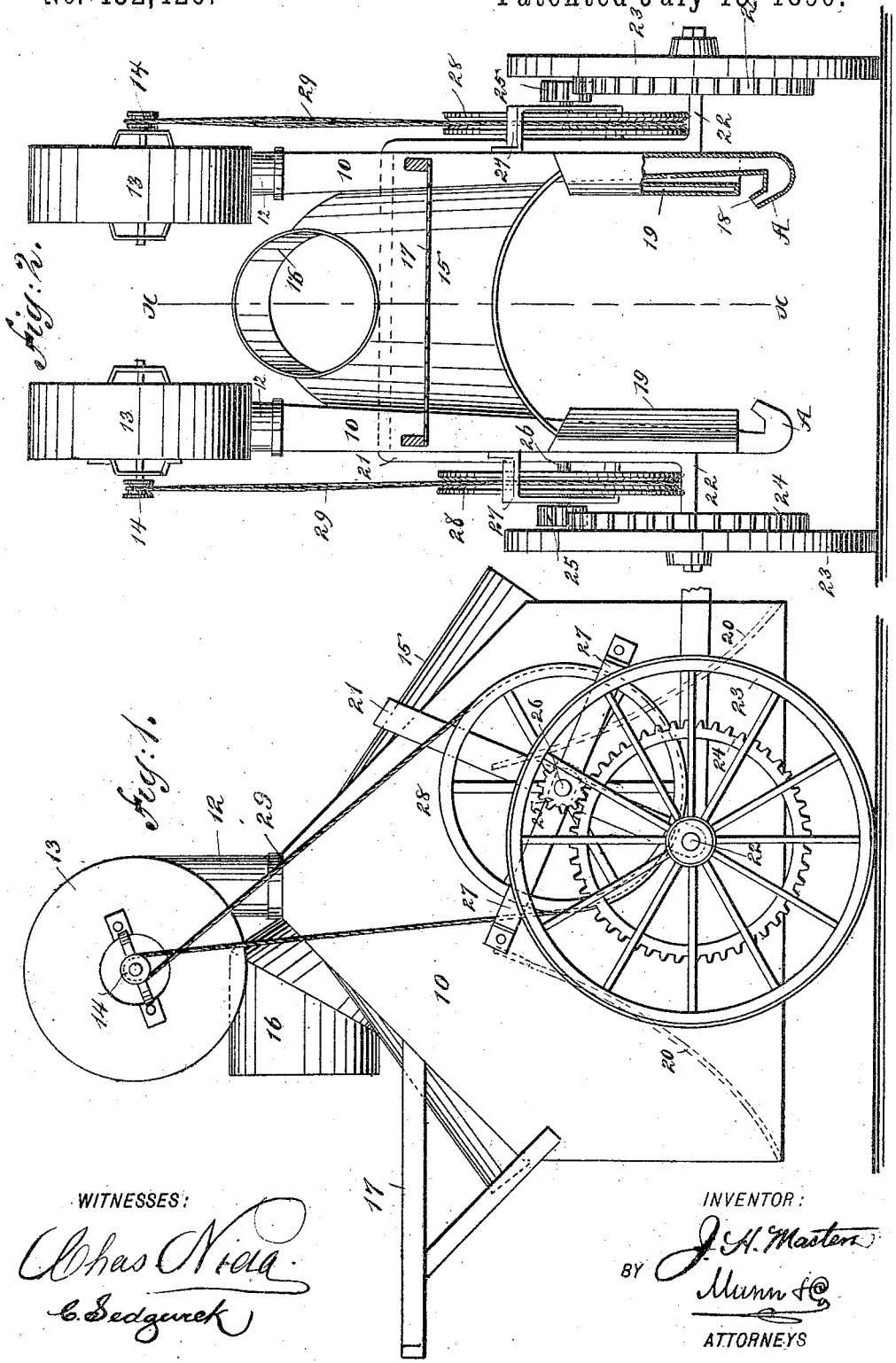

UNITED STATES PATENT OFFICE.

JOHN HENERY MASTERS, OF STOCKTON, CALIFORNIA.

COTTON-HARVESTER.

SPECIFICATION forming part of Letters Patent No. 432,420, dated July 15, 1890.

Application filed March 21, 1890. Serial No. 344,695. (No model.)

*To all whom it may concern:*

Be it known that I, JOHN HENERY MASTERS, of Stockton, in the county of San Joaquin and State of California, have invented a new and useful Improvement in Cotton-Harvesters, of which the following is a full, clear, and exact description.

My invention relates to an improvement in cotton-harvesters, and has for its object to provide a machine so constructed that when it is driven over the rows of plants the cotton will be blown from the bushes and made in the presence of the blast to pass through a suitable nozzle and into a bag or other receptacle placed to receive it.

A further object of the invention is to provide a harvester of simple and durable construction and which will economically harvest the ripened cotton.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the harvester. Fig. 2 is a rear elevation thereof, partly in section. Fig. 3 is a vertical longitudinal section taken on line $x\ x$ of Fig. 2; and Fig. 4 is a horizontal section through the body of the harvester, taken on line $y\ y$ of Fig. 3.

The sides 10 of the implement are identical in construction, the said sides being hollow, and they are preferably constructed of two spaced plates, and have an opening in the top, the under edge, and a portion of the ends only, as will be hereinafter described. The sides are preferably made tapering toward the center at their upper end edges, and the top opening, heretofore referred to, is centrally located at the top edge. Into the said opening a pipe 12 is introduced, connected with a casing 13, in which casing a fan of any suitable or approved construction is held to revolve, the outer end of the fan-shaft being provided with a pulley 14. The sides 10 are connected by a dome-shaped roof 15, which roof slants downward in opposite directions from its center.

At the top of the roof upon the rear side between the fans and the sides 10 a nozzle 16 is formed having direct communication with the space below the roof and between the sides 10. This nozzle extends upward and rearward, and is of sufficient size, ordinarily, to permit the mouth of a bag being placed thereon, which bag is supported, when attached to the nozzle, by a horizontal platform 17, attached in any suitable manner to the upper edges of the sides and the top of the roof at the rear of the latter.

The lower edges of the plates constituting the sides of the implement are upturned, as illustrated at A, and the plates at this point are not longitudinally connected, and are brought closer together than at the vertical portions of the sides, whereby a contracted opening 18 is obtained at the inner face of each side 10, and the lower ends of said sides are so upturned that the inclination of the upset or upturned portions will be in the direction of the center of the roof. The ends of the upturned or upset portions of the sides are closed, and the plates of the sides 10, at each end of the latter, between the roof and their lower extremities, are carried inward and spaced, providing thereby side outlets 19 for the exit of air forced downward by the fans heretofore referred to.

It will be observed that when the fans are revolved the air forced downward in the hollow sides 10 must of necessity find an exit under considerable pressure through the openings 18 at the bottom of the sides and the openings 19 at the ends; and as the openings 18 are faced in the direction of the upper central portion of the roof and the openings 19 inward and in the direction of the opposite side of the implement as the implement is drawn forward over the rows of cotton, the cotton is by air-pressure forced from the plants and carried upward and out through the nozzle 16 into the bag or other receptacle placed there to receive it.

Between the plates of each side 10 of the implement curved ribs 20 are formed, one being preferably located near each end, as shown in dotted lines in Fig. 1, which ribs serve to direct a proper proportion of the air-blast to the end openings 19, and as the lower ends of the ribs are located at the lower corners of the sides 10 the air-blast is enabled to pass outward through the lower opening 18 of each side from end to end of the same.

The axle 21 employed is a yoke-axle and is secured, preferably, to the forward portion of the roof and sides of the implement, the members of the axle being given a rearward inclination, and each member is also provided with an outwardly-extending horizontal spindle 22. Upon the spindles 22 the drive-wheels 23 are held to loosely revolve.

Each drive-wheel 23 is provided upon its inner face with an attached spur-gear 24, each of the spur-gears 24 being adapted to mesh with a pinion 25, attached to a shaft 26, one shaft being held to revolve in bearings in each member of the axle and a suitable guide-plate 27, attached to the outer face of each side 10.

Upon each shaft 26 a large pulley 28 is also securely mounted, and the said grooved pulleys are connected by belts 29 with the small grooved pulleys 14, secured to the fan-shafts. Thus as the implement is drawn forward the fans are rotated and sufficient volume and force of air are created to effectually blow the ripened cotton from the hulls of the plants and deliver the same to the receptacle placed to receive them. It will also be observed that, by reason of the peculiar formation of the roof, if any tall plants are brought in contact with the roof, the frictional contact of the latter with the cotton at the top of the plants will aid the air-blast in discharging the same from the hulls.

Having thus described my invention, I claim as new and desire to secure by Letters Patent—

1. A cotton-harvester consisting in a body having a closed top provided with an outlet, air-passages having upturned outlets along the lower edges of its sides and air-passages at the ends of the sides having converging inturned outlets, and an air-forcing mechanism, substantially as set forth.

2. In a cotton-harvester, the combination, with chambered sides having a lower upturned outlet and inwardly-converging outlets at their ends, of fans connected with the interior of the sides, and a roof connecting the said sides provided with an outlet-nozzle, substantially as shown and described.

3. In a cotton-harvester, the combination, with chambered sides, the lower ends of which are turned upward and inward and provided at said upturned ends with outlets, and inwardly-converging outlets arranged at each end of the sides and having communication with the interior thereof, of fans connected with the interior of the chambered sides, and a dome-shaped roof connecting the said sides below the fans and above the end outlets, the said roof being provided at one side of the center with a nozzle, substantially as shown and described, and for the purpose specified.

4. In a cotton-harvester, the combination, with chambered sides having their lower ends bent upward and inward and provided with a continuous opening, inwardly-converging outlets located at each end of each side having connection with the interior, and ribs formed between the walls of the said chambered sides, of fans connected with the interior of the sides at their upper central portion, a dome-shaped roof connecting the said sides above said outlets, which roof is provided at one side of the center with a nozzle, and a horizontal platform located beneath the nozzle of the roof, substantially as shown and described.

5. In a cotton-harvester, the combination, with chambered sides having their lower ends bent upward and inward and provided with a continuous opening, inwardly-converging outlets located at each end of each side, having connection with the interior, and ribs formed between the walls of the said chambered sides, of fans connected with the interior of the sides at their upper central portion, a dome-shaped roof connecting the said sides above the said outlets, which roof is provided at one side of the center with a nozzle, a horizontal platform located beneath the nozzle of the roof, a yoke-shaped axle attached to the roof and sides, drive-wheels loosely mounted upon the extremities of the said axle, and means, substantially as specified, for rotating the said fans from the said drive-wheels, whereby as the implement is drawn forward over a row of plants an air-blast will be directed upon the cotton and force the same upward through the roof-nozzle.

JOHN HENERY MASTERS.

Witnesses:
A. C. PARKER,
D. M. PEASE.